(12) United States Patent
Poulos et al.

(10) Patent No.: US 10,647,227 B2
(45) Date of Patent: May 12, 2020

(54) PRECISION LINEAR MECHANICAL LOCK DEVICE

(71) Applicants: Edward Poulos, Grosse Ile, MI (US); Richard T. Oliver, Noblesville, IN (US)

(72) Inventors: Edward Poulos, Grosse Ile, MI (US); Richard T. Oliver, Noblesville, IN (US)

(73) Assignee: Porter Systems Inc., Novi, MI (US)

( * ) Notice: Subject to any disclaimer, the term of this patent is extended or adjusted under 35 U.S.C. 154(b) by 0 days.

(21) Appl. No.: 15/369,841

(22) Filed: Dec. 5, 2016

(65) Prior Publication Data
US 2018/0154801 A1    Jun. 7, 2018

(51) Int. Cl.
*B60N 2/23*      (2006.01)

(52) U.S. Cl.
CPC .................... *B60N 2/23* (2013.01)

(58) Field of Classification Search
CPC ....... B60N 2/23; B60N 2/443; F16F 2222/04; F16B 7/1481; F16B 7/08; F16D 63/008; F16D 2121/16; F16D 2250/0076; F16D 41/20; F16D 41/206; E05Y 2201/49
USPC ......................................... 188/67; 192/223.4
See application file for complete search history.

(56) References Cited

U.S. PATENT DOCUMENTS

| | | | | |
|---|---|---|---|---|
| 3,874,480 A | * | 4/1975 | Porter | B60N 2/23 188/67 |
| 4,685,734 A | * | 8/1987 | Brandoli | B60N 2/23 297/362.12 |
| 5,150,771 A | * | 9/1992 | Porter | E05C 17/30 188/67 |
| 5,794,470 A | * | 8/1998 | Stringer | B60N 2/23 188/67 |
| 6,164,419 A | * | 12/2000 | Tribbett | B60N 2/443 188/67 |
| 6,685,272 B1 | * | 2/2004 | Bonk | B60N 2/23 297/440.21 |

(Continued)

FOREIGN PATENT DOCUMENTS

WO     WO-0076802 A1 * 12/2000 ............... B60N 2/23

OTHER PUBLICATIONS

ASTM International Book of Standards. http://www.astm.org/Standards/A1010.htm. Jun. 22, 2012. (Year: 2012).*

(Continued)

*Primary Examiner* — Bradley T King
*Assistant Examiner* — Stephen M Bowes
(74) *Attorney, Agent, or Firm* — Heed Law Group PLLC; Thomas P. Heed

(57) ABSTRACT

The present invention is a linear mechanical lock of the type used in vehicle seating. The linear mechanical lock uses a housing, rod, sleeve, bushings, release lever, clutch springs, and return spring. The present invention is an improved precision linear mechanical lock device using a two-piece clamshell housing. The two-piece clamshell housing has formed projections that locate and align the bushings within the housing. The two-piece clamshell housing has additional design features improving manufacturability, cost and reliability such as lanced tabs to align the internal components, lanced bumps to act as a return spring perch, cable mounts, and an extruded mounting hole.

21 Claims, 4 Drawing Sheets

(56) References Cited

U.S. PATENT DOCUMENTS

| | | | | |
|---|---|---|---|---|
| 7,350,628 B2* | 4/2008 | Adoline | ................ | F16F 3/04 |
| | | | | 188/67 |
| 2003/0075394 A1* | 4/2003 | Shields | ................ | B60N 2/23 |
| | | | | 188/67 |

OTHER PUBLICATIONS

Zhang, Camille. "Carbon Steel: Forging Facts & Characteristics from Jianhui Metals Group". Aug. 8, 2016. (Year: 2016).*
ASTM Standard A228/A228M—16. Steel Wire, Music Spring Quality Standard Specification. (Year: 2016).*
ASTM Standard A1010/A1010M—13. Higher-Strength Martensitic Stainless Steel Plate, Sheet, and Strip Standard Specification. (Year: 2013).*
ASTM Standard E1045—00 (Reapproved 2016). Sahli Hemoglobin Pipet Standard Specification. (Year: 2016).*

\* cited by examiner

PRECISION LINEAR MECHANICAL LOCK DEVICE

FIELD OF INVENTION

This invention relates to the classification of chairs and seats. Specifically, this invention pertains to the field of mechanical locking devices used to position vehicle seatbacks.

BACKGROUND OF INVENTION

A linear mechanical lock has a rod axially movable through a lock housing, and one or more coil springs, called clutch springs, tightly wound about the rod and axially fixed to the housing so as to normally grip the rod against movement through the housing. A release partially unwinds the coil spring or springs such that the internal diameter of the spring is increased and the rod is released for axial movement relative to the lock housing.

Linear mechanical locks are widely used in recliner seats used in automobiles and other vehicles. In such installations, the housing of the linear mechanical lock is attached to either the reclinable seatback or the stationary seat, while the end of the rod is connected to the other of those two seat components. In its normally locked condition the device fixes the position of the seatback. If the occupant desires to reposition the seatback, the lock is manually released, which frees the rod and allows movement of the seatback. The linear mechanical lock typically has a heavier exterior coil spring, called a return spring, which returns the rod to an extended condition when the lock is released. For example, the restoring spring may serve to bring the seatback to a fully upright condition.

In applications with bi-directional loading of the rod, two clutch springs may be provided, one on each side of a common release lever and axially contained between two end bushings. Each bushing engages an end tang of a corresponding spring to fix the tang and the outer end coils of the spring against rotation about the rod. The inner end coils of the springs are connected to a release lever. The release lever, when actuated, can simultaneously unwinding both springs to free the rod for axial movement through the housing.

The bushings serve at least three distinct functions. The bushings are annular, with an axial bore. An inner radial bearing surface supports the rod, allowing the rod to slide through the lock housing. A radial slot in the bushing receives an end tang of the clutch spring, to circumferentially fix the outer end of the spring and prevent this end of the spring from turning about the rod. Finally, an axial bearing surface on the bushing is circumferentially spaced by 90 degrees from the clutch spring tang. When the clutch spring is pulled with the rod against the axial bearing surface by a load acting on the rod relative to the lock housing, the end coils of the clutch spring are canted relative to the rod axis. This canting deforms the coils from a normal circular shape to an ellipsoid shape, and substantially increases the frictional engagement between the clutch spring coils and the rod. The clutch spring better resists the load and makes for a more positive lock of the rod relative to the housing so long as the loading condition persists.

In order to distribute the unwinding action more evenly over the length of the spring, one or more tubular sleeves may be used. A tubular sleeve envelops the clutch spring or springs, insuring that the coils unwind uniformly, rather than unwinding solely at the end with the release lever. Such a sleeve improves performance, allowing for quick release action of the lock.

During fabrication, the relative positions of the lock elements in the housing is rather critical and a high degree of precision must be maintained in assembling the lock. As a result, the fabrication and utility of the housing are critical. Many locks of this sort require components to be assembled inside a housing prior to the housing being bent or formed into its final shape. Such a process leads to a high degree of fall-out at all portions of the product life cycle.

The global automotive market is exceptionally competitive, meaning that automotive manufacturers are constantly striving for the seemingly contradictory goals of improved features, less expense, lighter weight, higher reliability, and more durability. As a result, linear mechanical locks used in adjustable and reclining seats not only need to be able to support a substantial load, but also be inexpensive, lightweight, reliable, and durable. Moreover, because of how they are used, locks used in vehicle seating have to account for both kinetic and static loading requirements.

PRIOR ART REVIEW

There is clearly a market demand for a simple, lightweight, inexpensive, reliable and easy-to-use vehicle seatback lock. The recent prior art illustrates many different examples and strategies to provide such a solution, all of which could be significantly improved in some aspect. Prior art linear mechanical locks exhibit drawbacks which generally increase costs and reduce reliability. For example, U.S. Pat. No. 3,874,480, by named inventors Porter, et. al., entitled, "Friction brake mechanism" ("Porter '480") teaches a vehicle seatback lock that uses a tubular housing element. Porter '480 teaches assembling the springs, bushings and release lever on the rod, and then inserting the rod into the tubular housing. The tubular housing had several drawbacks related to the precision needed during assembly.

The tube style housing evolved into a two-piece clam shell housing, described in European patent application number 85201888 filed Nov. 18, 1985, Publication number 0 182 440 A2, by named inventor Brandoli ("Brandoli '888"). Brandoli '888 teaches forming an envelope or housing by using two half-shells. The rod is first fitted with the two coil springs, a release lever including a containment sleeve about the springs, and a pair of end bushings which engage the ends of the coil spring. Brandoli '888 discloses that the half-shells are mated to each other with the rod assembly in-between, and welded to the bushings to enclose the rod assembly. The rod slides through the bushings and the housing when the spring is unwound to permit movement. The axial spacing of the bushings on the rod is determined by the welding operation. Misalignment of the bushings introduces a degree of frictional drag into the lock mechanism. In addition, the bushings add significantly to the cost of the lock, and may have to be differentially hardened to provide hard bearing surfaces as well as untreated portions which can be welded. By relying on a welding process to control a critical dimension, Brandoli '888 achieved a substandard product. In 1985, it was very difficult to produce locks with welded bushings which were perfectly aligned with the rod axis. This was primarily because robotic welding was nascent, and the art was bereft of design features that would allow precision welding. Additionally, Bandoli '888 failed to disclose a method for axially locating the bushings.

U.S. Pat. No. 5,157,826, by named inventors Porter, et. al., entitled, "Method for making linear mechanical lock with one-piece lock housing" ("Porter '826") teaches a method for forming a housing out of a single piece of material. Porter '826 discloses taking a sheet of metal, and making two shell halves out of it which are connected by a hinge line. Porter '826 teaches a more robust method for making a linear mechanical lock by using a one-piece housing. However, the one-piece housing with a hinge line is a relatively costly component.

U.S. Pat. No. 5,441,129, by named inventor Porter, et. al., entitled, "Precision linear mechanical lock" ("Porter '129") teaches a linear mechanical lock for use in vehicle seating in which the housing is fabricated from at least two metal plates. Porter '129 does not make claim to particular methods of joining the two halves. There are additional patents and prior art for linear seatback locks. Improvements can be made compared to the current prior art by integrating welding bosses and other design features into the part, improving part location and alignment, reducing overall cost, easing installation, and improving reliability.

Although linear seatback locks are well-known in the art, the cost and reliability pressure inherent in the automotive industry demands continued refinement and improvement. The prior art does not disclose a precision linear mechanical lock in which significant functionality, manufacturability, and reliability improvements are achieved through the forming of the housing, itself.

SUMMARY OF THE INVENTION

This summary is intended to disclose the present invention, an improved precision linear mechanical lock. The embodiments and descriptions are used to illustrate the invention and its utility, and are not intended to limit the invention or its use.

The improved precision lock uses a two-piece clamshell housing, a rod, two clutch springs, a power or return spring, two bushings, and a sleeve with an integral release tab. The cartridge is a subassembly comprised of the two clutch springs, two bushings, and the sleeve. Compared to the prior art and the current state of the art in the market, the two-piece clamshell housing reduces cost, eases assembly, and improves reliability. The two-piece clamshell housing is fabricated from sheet steel by progressive stamping of symmetrically opposite pairs. A standard sheet steel, such as ASTM 1010, is used for the two-piece clamshell housing. The two pieces of the housing are durably bonded to one another, during manufacturing, using a method such as swaging, welding, crimping, or metal bonding.

The two-piece clamshell housing has several features that reduce cost and improve reliability. The two-piece clamshell housing has formed projections for the precision resistance welding of the bushings. The formed projections also act as integral bushing locators, and correctly align the bushings with the housing. The two-piece clamshell housing has lanced tabs for cartridge alignment during assembly. The two-piece clamshell housing has lanced bumps for a return spring perch. The two-piece clamshell housing has an integral cable anchorage for a Bowden cable termination. The Bowden cable connecting a release lever accessible to the user or seat occupant with the integral lever on the sleeve. The two-piece clamshell housing has an extruded integral mounting hole, easing the mounting process and insuring the correct positioning of the improved precision linear mechanical lock. The two-piece clamshell housing has a punched shaft keyhole that serves an integral cable lever shaft journal. The two-piece clamshell housing has a blanked feature that serves as an integral cable system block mounting lug for a Bowden cable control head.

Improvements have also been made to the rod, which has an integral on-axis mounting feature. The rod is fabricated from a common structural steel, such as ASTM 1045.

The improved precision linear mechanical lock is assembled by first unwinding the clutch springs and threading the rod through the cartridge stack. The rod and cartridge are placed in the two-piece clamshell housing. The assembly is placed in a welder. Axial compression is applied to the cartridge stack while the bushings are welded into place and the two pieces of the clamshell housing are joined. The axial compression yields consistent mass-produced assemblies with proper bushing alignment. Free play in the clutch springs along the rod is removed by compressing the cartridge during fabrication.

The improved precision linear mechanical lock retains the rod in place, whether it is loaded or not. One end of the rod extends out of the two-piece clamshell housing. In their natural state, the two clutch springs are wound coaxially on the rod, with one clutch spring on either side of a sleeve with an integral release lever. The inner diameter of the coil of the two clutch springs is less than the outer diameter of the rod. The clutch springs prevent the rod from moving, axially, through the housing. The clutch springs have inner tangs captured in slots in the release sleeve. The outer ends of the clutch springs have tangs circumferentially fixed to the bushings. The bushings can be fabricated from a wide variety of materials, including plastic, aluminum, tin, magnesium, zinc, steel, iron, or powdered metal. The release sleeve is positioned between the springs, and is rotatable about the rod. The clutch springs are each located between the release sleeve and a bushing. The bushings allow the rod to freely slide through their inner diameters. A return spring is disposed on the exposed end of the rod. The cartridge components and part of the rod are held inside the two-piece clamshell housing.

A load applied in one direction causes an associated clutch spring to push against its bushing causing the clutch spring to cant, slightly, increasing the retention force of that clutch spring by making the coils slightly elliptical. A load applied in the other direction causes the other clutch spring to cant on its bushing, increasing the retention force of that clutch spring. The sleeve has an integral release lever. When the release lever is actuated, both clutch springs are unwound, allowing the rod to slide freely through the two bushings. With the release lever actuated, the seatback may be freely moved by applying the appropriate force on the seatback. When the release lever is released, the clutch springs re-wind and grab the rod, locking the seatback in place. A return spring applies force, moving the improved precision linear mechanical lock to a default position if the release lever is actuated, but no force is applied to the seatback. The clutch springs and return springs are fabricated with common spring steels, such as ASTM A228.

The two-piece clamshell housing is internally sized to closely encompass the spring between the bushings. As a result, when the clutch springs are unwound, the two-piece clamshell housing distributes the slack caused by unwinding the coil, allowing the improved precision linear mechanical lock to quickly and positively release the rod in response to the actuation of the release lever.

The improved precision linear mechanical lock is normally installed between two load elements which are movable relative to each other, such as a seat and seatback. The integral on-axis mount of the rod is fixed to one of the load elements. The integral mounting feature of the two-piece clamshell housing is fixed to the other load element. When an axial load is applied between the on-axis mount of the rod and the integral mounting feature of the two-piece clamshell housing, the axial movement of the rod is locked by the clutch spring.

BRIEF DESCRIPTION OF THE DRAWINGS

The present invention is illustrated with 10 drawings on 4 sheets.

DETAILED DESCRIPTION OF THE DRAWINGS

The following descriptions are not meant to limit the invention, but rather to add to the summary of invention, and illustrate the present invention, by offering and illustrating various embodiments of the present invention, an improved precision linear mechanical lock 1 for use in vehicle seating applications. While embodiments of the invention are illustrated, and described, the embodiments herein do not represent all possible forms of the invention. Rather, the descriptions, illustrations, and embodiments are intended to teach and inform without limiting the scope of the invention.

Figure 1:
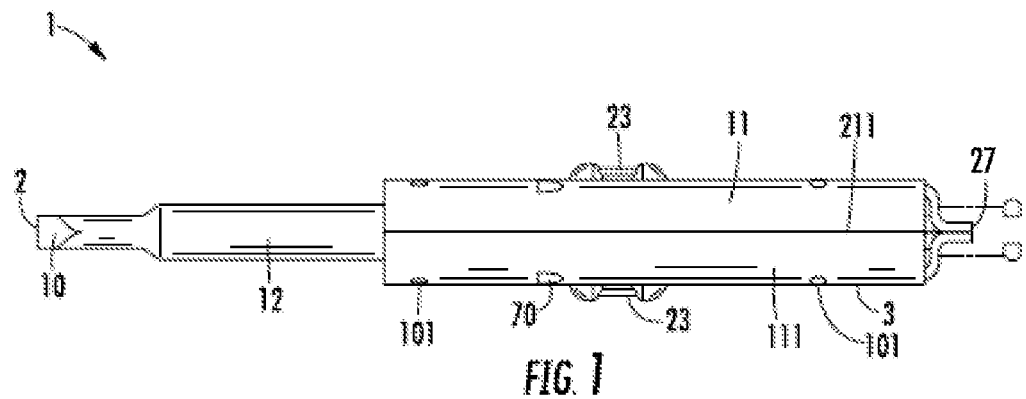
FIG. 1 is a top view of the present invention, an improved precision linear mechanical lock.
Figure 2:
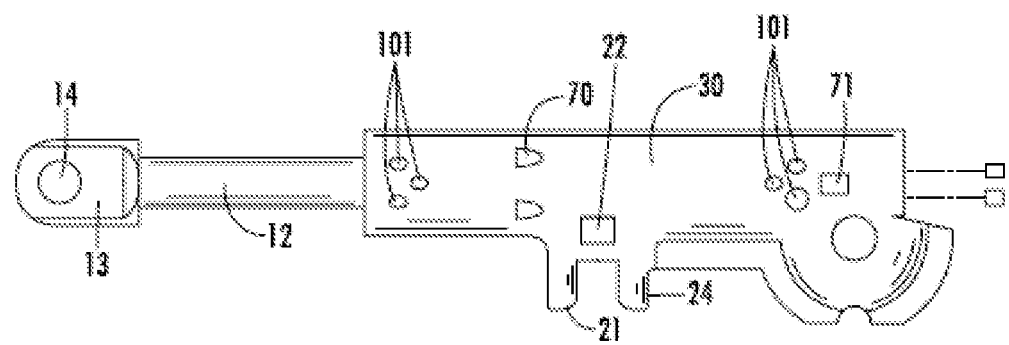
FIG. 2 is a lateral view of the present invention, an improved precision linear mechanical lock.
Figure 3:
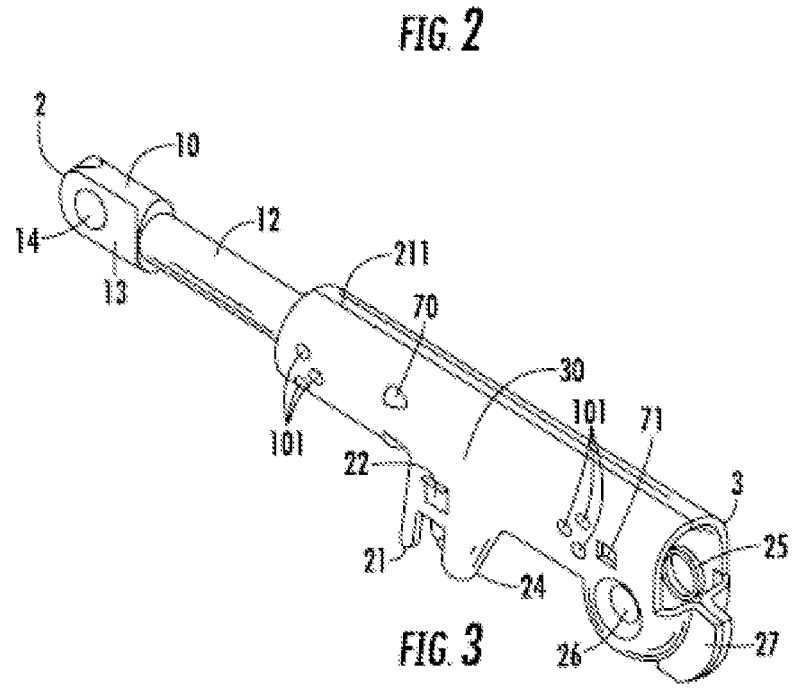
FIG. 3 is an isometric view of the present invention, an improved precision linear mechanical lock.

FIGS. 1-3 show multiple views of the exterior present invention 1. The improved precision linear mechanical lock 1 has a two-piece clamshell housing 3 and a rod 2. The two-piece clamshell housing 3 has two halves 11, 30, 111, 130 joined on the top 211, using a method such as swaging, welding, crimping, or metal bonding. The two-piece clamshell housing 3 has a defined upper surface 11, 111 and defined lateral surfaces 30. The two-piece clamshell housing 3 is fabricated from sheet steel, such as ASTM 1010, A1010M-13, by progressive stamping of symmetrically opposite pairs. ASTM 1010, A1010M-13 is the current ASTM standard for ASTM 1010 steel.

The rod 2 has a shaft 12 and an integral mounting feature 10, 13, 14. The integral mounting feature 10, 13, 14 allows the present invention 1 to be easily connected to a load, such as a vehicle seat or seatback. The rod 2 is fabricated from common structural steel such as ASTM 1045 carbon steel. A crimp 27 on the end of the two-piece clamshell housing 3 acts as a rod 2 stop. In an alternative embodiment, the end of the rod 2 can be orbitally peened (not shown) to act as a rod 2 stop.

The two-piece clamshell housing 3 has several built-in features to improve reliability and manufacturability while reducing cost. The two-piece clamshell housing 3 has formed projections 101 to aid in the alignment, location, and resistance welding of the bushings 52 (shown in FIGS. 9-10), improving reliability of the precision linear mechanical lock 1 by properly locating and aligning the bushings 52 within the two-piece clamshell housing 3. The two-piece clamshell housing 3 has lanced bumps 70 that serve as a return spring 59 (shown in FIGS. 9-10) perch, improving manufacturability by creating a positive feature on which to terminate the return spring 59. The two-piece clamshell housing 3 has an integral cable anchorage 23 for a Bowden cable (not shown) termination. The integral cable anchorage 23 each have two projections 21, 24 and an aperture 22, improving manufacturability by easing assembly of the Bowden cable. The two-piece clamshell housing 3 has an extruded integral mounting hole 26, improving manufacturability and reliability by easing the mounting process and insuring the correct positioning of the precision linear mechanical lock 1. The clamshell housing 3 has two halves 11, 30, 111, 130 that are joined at a seam tab 27. In order to limit the travel of the rod 2, a crimp 25 is placed on the rod 2 to act as a stop. The two-piece clamshell housing 3 has an alignment window 71 through which the alignment and presence of the bushing 52 (shown in FIGS. 9-10) can be viewed.

Figure 9:
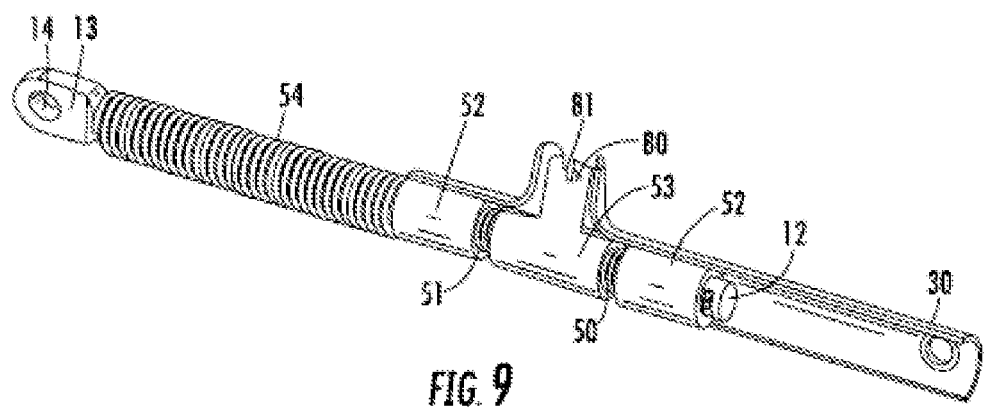
FIG. 9 is an isometric view of the present invention, with the near-side of the two-piece clamshell housing removed, showing the arrangement of the rod and cartridge elements.
Figure 10:
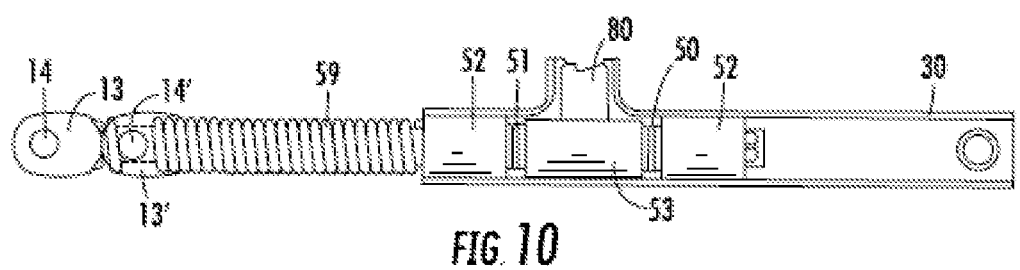
FIG. 10 is a lateral view of the present invention, with the near-side of the two-piece clamshell housing removed, showing the arrangement of the rod and cartridge elements.

FIGS. 9-10 show the present invention 1 with one-half of the two-piece clamshell housing 3 removed. The distal piece 30 of the two-piece clamshell housing 3 is visible in the drawing. A return spring 54 sits on the shaft 12 of the rod 2. The return spring 54 terminates at the integral mounting feature 13, 14 of the rod 2. FIG. 10 shows the compressed state 59 of the return spring 54, with the associated position of the integral mounting feature 13', 14'.

A sleeve 53 with an integral release lever 80 sits in the center of the present invention 1. On the integral release lever 80 is a slot 81 which connects with a release cable (not shown). On either side of the sleeve 53 is a clutch spring 51, 50. Each clutch spring 51, 50 lies between the sleeve 53 and a bushing 52. The clutch springs 51, 50 and the return spring 54, 59 are fabricated from spring steel, such as ASTM A228/A228M-16. ASTM A228/A228M-16 is the current ASTM standard for spring steel.

Figure 4:
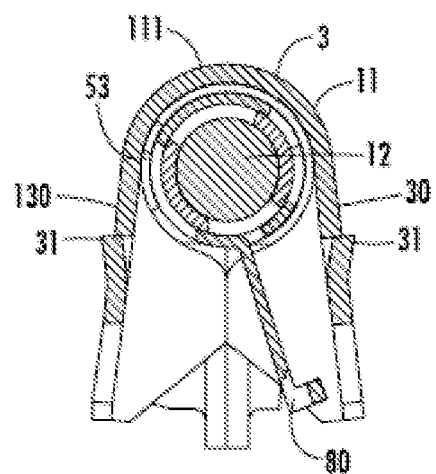
FIG. 4 is an axial cross-section of the present invention.
Figure 8:
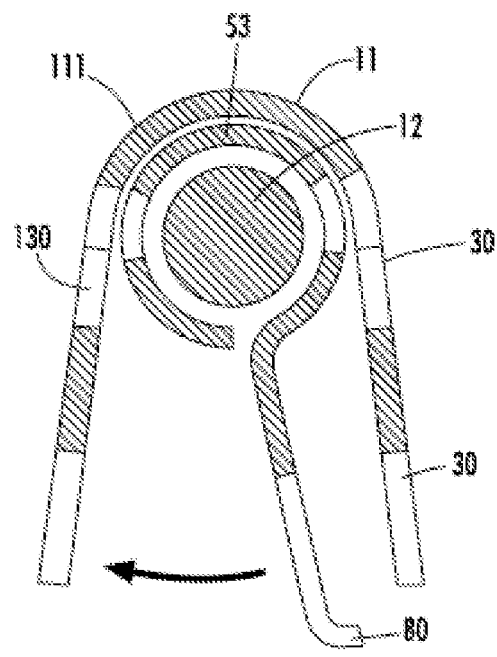
FIG. 8 is an axial cross-section of the present invention, showing the direction of actuation for the release lever.

FIGS. 4 and 8 show an axial cross-section of the present invention 1. The rod shaft 12 is inside the sleeve 53. The sleeve 53 and rod shaft 12 are inside the two-piece clamshell housing 3. The two-piece clamshell housing 3 has two pieces, each piece has a side surface 30, 130 and rounded top surfaces 111, 11. A aperture lip 31 is shown. By actuating the release lever 80 in the direction shown in FIG. 8, the clutch springs 51, 50 are unwound and the rod shaft 12 is released.

Figure 5:
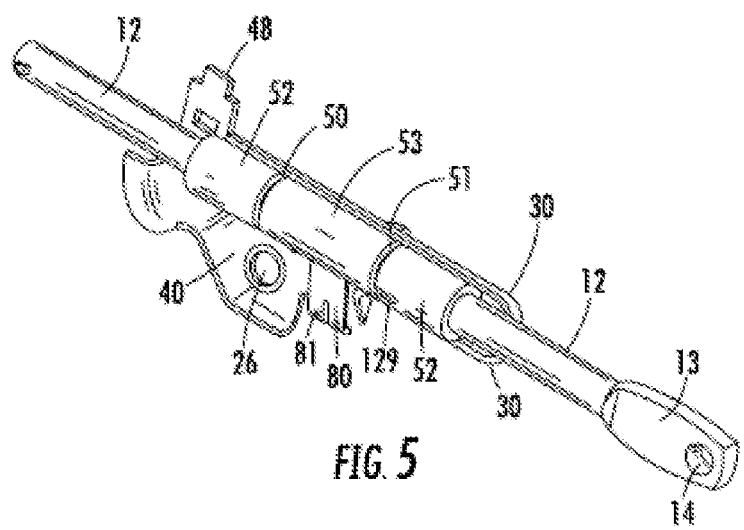
FIG. 5 is an isometric view of the present invention, with the near-side of the two-piece clamshell housing removed.

FIG. 5 shows the present invention with the near side piece of the two-piece clamshell housing 3 removed. The distal piece 30, 40, 48 of the two-piece clamshell housing 3 is visible. An optional protruding feature with a window 48, which serves as an integral cable system block mounting lug for a Bowden cable control head, can be stamped into the two-piece clamshell housing 3. The two-piece clamshell housing 3 has a substantially planar ear 40 into which an integral mounting hole 26 is extruded. The rod shaft 12 and integral mounting feature 13, 14, are visible. The rod shaft 12 slides through the bushings 52, when the clutch springs 50, 51 are unwound. The bushings 52 can be fabricated from a wide variety of materials, including plastic, aluminum, tin, magnesium, zinc, steel, iron, or powdered metal. The bushings 52 have a slot 129 into which a clutch spring 51 tang fits. The sleeve 53 with integral release lever 80 is situated between the clutch springs 50, 51 and bushings 52. The integral release lever 80 has a slot 81 into which the release cable (not shown) fits.

Figure 7:
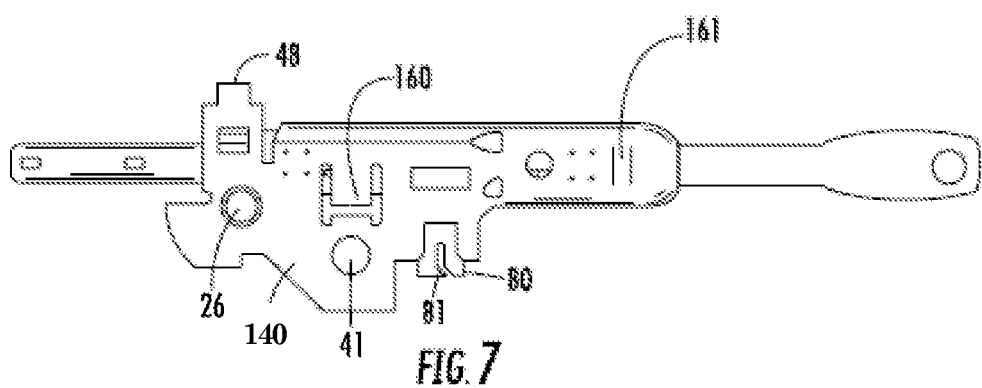
FIG. 7 is a reverse lateral view of that shown in FIG. 2.

FIG. 7 shows the present invention with the near side piece of the two-piece clamshell housing 3 in situ. The optional protruding feature with a window 48, which serves as an integral cable system block mounting lug for a Bowden cable control head, is visible, as is an elongated substantially planar ear 140 in which there is punched shaft keyhole 41. The integral release lever 80 has a slot 81 into which a release cable (not shown) fits. An extruded integral mounting hole 26 allows the present invention 1 to be easily mounted to a load. Two lanced tabs 160, 161 align the cartridge inside the two-piece clamshell housing 3.

Figure 6:
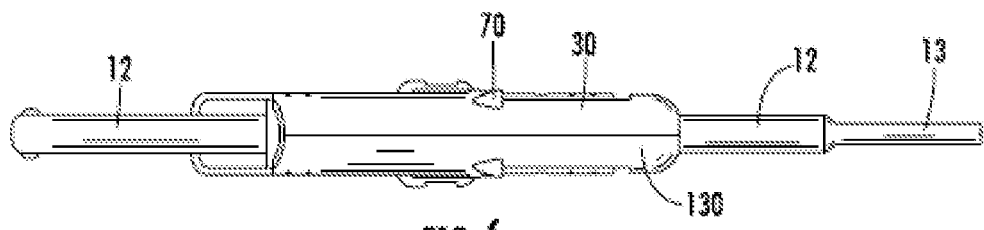
FIG. 6 is a top view of the present invention, an improved precision linear mechanical lock, with the rod projected out of the clamshell, in order to ascertain its relative side with respect to the housing.

FIG. 6 shows a projection of the rod shaft 12 through the two-piece clamshell housing 3. The two pieces 30, 130 of the two-piece clamshell housing are visible. On the top of the two-piece clamshell housing 3 are lanced bumps 70 that serve as a perch for the return spring 54.

We claim:

1. In a precision linear mechanical lock device comprising:
   a rod with a substantially cylindrical rod shaft and an integral mounting feature located at one end of the shaft;
   a sleeve with an integral release lever;
   a return spring;
   at least one cylindrical clutch spring;
   at least one cylindrical bushing; and
   a housing;
   wherein the rod fits through the at least one bushing and housing;
   wherein the improvement comprises:
   using the at least one cylindrical bushing;
   fabricating the housing out of a two-piece clamshell, wherein the two-piece clamshell housing is progressively stamped out of sheet steel, the two pieces of the two-piece clamshell housing are a substantially symmetrically opposite pair, each piece of the two-piece clamshell has at least two formed projections per bushing, and the two pieces of the two-piece clamshell are durably bonded together during fabrication;
   wherein the formed projections align the at least one cylindrical bushing and the rod within the two-piece clamshell housing;
   wherein the formed projections locate the at least one cylindrical bushing within the two-piece clamshell housing;
   wherein the formed projections are used for resistance welding the at least one cylindrical bushing to the two-piece clamshell housing, fixing the at least one cylindrical bushing within the two-piece clamshell housing; and
   wherein the interior of the two-piece clamshell housing is sized to closely encompass the at least one coiled clutch spring so that, when the least one coiled clutch spring is unwound with the integral release lever, the slack in the unwound coil of the at least one coiled clutch spring contacts the inside of the two-piece clamshell housing, and the two-piece clamshell housing evenly distributes the slack in the unwound coil of the at least one coiled clutch spring, allowing the precision linear mechanical lock device to uniformly unlock the rod.

2. The precision linear mechanical lock device of claim 1, wherein the at least one coiled clutch spring comprises two coiled clutch springs and the at least one cylindrical bushing comprises two cylindrical bushings.

3. The precision linear mechanical lock device of claim 2, wherein a cartridge is comprised of the sleeve, the two cylindrical bushings, and the two coiled clutch springs; wherein axial compression is applied to the cartridge, during the fabrication process, while the two cylindrical bushings are welded into place; wherein the two-piece clamshell housing has lanced tabs to align the cartridge during assembly.

4. The precision linear mechanical lock device of claim 1, wherein the two-piece clamshell housing has an extruded integral mounting hole and wherein an axial load applied between the extruded integral mounting hole of the two-piece clamshell housing and the integral mounting feature of the rod causes one of the coiled clutch spring to press against the at least one cylindrical bushing in such a way as to cant the coiled clutch spring, thereby increasing that coiled clutch spring's retention force of the rod while the load is applied.

5. The precision linear mechanical lock device of claim 1, wherein the two-piece clamshell housing has at least one lanced bump that serves as a perch for the return spring.

6. The precision linear mechanical lock device of claim 1, wherein the two-piece clamshell housing has an integral cable anchorage.

7. The precision linear mechanical lock device of claim 6, wherein the integral cable anchorage has two projections and an aperture.

8. The precision linear mechanical lock device of claim 1, wherein the two-piece clamshell housing has an extruded integral mounting hole.

9. The precision linear mechanical lock device of claim 8, wherein a seat is a first load and a seatback is a second load, and the extruded integral mounting hole of the two-piece clamshell housing is attached to one of the first and second loads, and the integral mounting feature of the rod is attached to the other of the first and second loads.

10. The precision linear mechanical lock device of claim 9, wherein the extruded integral mounting hole of the two-piece clamshell housing is attached to the seat, and the integral mounting feature of the rod is attached to the seatback.

11. The precision linear mechanical lock device of claim 9, wherein the extruded integral mounting hole of the two-piece clamshell housing is attached to a vehicle seatback, and the integral mounting feature of the rod is attached to a vehicle seat.

12. The precision linear mechanical lock device of claim 1, wherein the two-piece clamshell housing has a punched shaft keyhole that serves an integral cable lever shaft journal.

13. The precision linear mechanical lock device of claim 1, wherein the two-piece clamshell housing has a protruding feature with a window that serves as a lug for mounting Bowden cable control head.

14. The precision linear mechanical lock device of claim 1, wherein the two pieces of the two-piece clamshell housing are durably joined using at least one of the following: swaging, welding, crimping, or metal bonding.

15. The precision linear mechanical lock device of claim 1, wherein the rod is fabricated from carbon steel.

16. The precision linear mechanical lock device of claim 1, wherein the sleeve and integral release lever are fabricated from at least one of plastic, aluminum, tin, magnesium, zinc, steel, iron, or powdered metal.

17. The precision linear mechanical lock device of claim 16, wherein the integral release lever has a slot into which a release cable fits.

18. The precision linear mechanical lock device of claim 1, wherein one end of the two-piece clamshell housing terminates in a seam tab.

19. The precision linear mechanical lock device of claim 1, further comprising a means for limiting the rod travel into the two-piece clamshell housing.

20. The precision linear mechanical lock device of claim 19, in which a crimp on the end of the two-piece clamshell housing oriented on the side of the rod distal from the integral mounting feature of the rod acts as a stop for the rod, limiting the rod travel into the two-piece clamshell housing.

21. The precision linear mechanical lock device of claim 1, wherein at least one of the return spring or the coiled clutch spring is fabricated from spring steel.

\* \* \* \* \*